United States Patent
Garciamoreno et al.

(10) Patent No.: US 10,496,086 B2
(45) Date of Patent: Dec. 3, 2019

(54) GAS TURBINE ENGINE FLEET PERFORMANCE DETERIORATION

(71) Applicant: General Electric Company, Schenectady, NY (US)

(72) Inventors: Carlos Jose Garciamoreno, Queretaro (MX); Juan Pablo Arroyo, Queretaro (MX); David Lacey Doel, Maineville, OH (US); Tim Horejs, Cincinnati, OH (US); Pablo Ochoa, Queretaro (MX)

(73) Assignee: General Electric Company, Schenectady, NY (US)

( * ) Notice: Subject to any disclaimer, the term of this patent is extended or adjusted under 35 U.S.C. 154(b) by 309 days.

(21) Appl. No.: 15/375,516

(22) Filed: Dec. 12, 2016

(65) Prior Publication Data
US 2018/0164796 A1 Jun. 14, 2018

(51) Int. Cl.
G05B 23/02 (2006.01)
F01D 21/00 (2006.01)
F01D 21/14 (2006.01)

(52) U.S. Cl.
CPC ....... G05B 23/0283 (2013.01); F01D 21/003 (2013.01); F01D 21/14 (2013.01); G05B 23/0213 (2013.01); F05D 2220/32 (2013.01); F05D 2260/80 (2013.01); G05B 23/0272 (2013.01)

(58) Field of Classification Search
USPC ......................................................... 702/34
See application file for complete search history.

(56) References Cited

U.S. PATENT DOCUMENTS

| | | | |
|---|---|---|---|
| 7,286,923 B2 | 10/2007 | Pomeroy et al. | |
| 7,577,549 B2 | 8/2009 | Osborn et al. | |
| 8,014,929 B2 | 9/2011 | Page et al. | |
| 8,437,941 B2 | 5/2013 | Chandler | |
| 8,600,917 B1 | 12/2013 | Schimert et al. | |
| 2004/0148940 A1 | 8/2004 | Venkateswaran et al. | |
| 2004/0153815 A1* | 8/2004 | Volponi ............. | G05B 23/0275 714/37 |
| 2005/0049832 A1 | 3/2005 | Gorinevsky | |
| 2009/0014245 A1 | 1/2009 | Shevchenko et al. | |
| 2010/0280730 A1* | 11/2010 | Page ........................ | F02C 9/28 701/100 |
| 2010/0292905 A1 | 11/2010 | Agrawal et al. | |
| 2016/0163132 A1 | 6/2016 | Rabenoro et al. | |

* cited by examiner

*Primary Examiner* — Paul D Lee
(74) *Attorney, Agent, or Firm* — Dority & Manning, P.A.

(57) ABSTRACT

A method for determining gas turbine engine fleet performance deterioration includes receiving data indicative of deterioration parameter values for a plurality of gas turbine engines. The method also includes determining an average deterioration parameter value for each gas turbine engine at a plurality of intervals, and further determining an individual engine slope between the average deterioration parameter value at each adjacent interval for each gas turbine engine. The method also includes determining a fleet average slope between each adjacent interval based on the individual engine slopes between each adjacent interval, the determined fleet average slopes being usable to determine a performance deterioration of a gas turbine engine in the fleet.

20 Claims, 6 Drawing Sheets

GAS TURBINE ENGINE FLEET PERFORMANCE DETERIORATION

FIELD

The present subject matter relates generally to a system and method for determining performance deterioration of a fleet of gas turbine engines.

BACKGROUND

A gas turbine engine generally includes, in serial flow order, a compressor section, a combustion section, and a turbine section. In operation, ambient air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section.

The longer a gas turbine engine is in operation, however, a performance or efficiency of the gas turbine engine degrades. For example, performance deterioration may result in a loss in efficiency, increased emissions, etc. Performance deterioration may be a result of components within a flowpath of the engine becoming covered with foreign particles, eroded, corroded, rusted, damaged, etc. After a certain amount of performance deterioration, the gas turbine engine must go in for service, repair, or overhaul. When the gas turbine engine is one of a fleet of similar gas turbine engines (e.g., one of a plurality of the same make and model gas turbine engines), information may be collected from the fleet of gas turbine engines to determine a performance deterioration model for the gas turbine engines. The performance deterioration model may be used to predict a gas turbine engine's performance deterioration based on, e.g., an amount of time the particular gas turbine engine in the fleet has been operating.

However, current data collection and analysis techniques can result in performance deterioration models with room for improvement in accuracy. Accordingly, a more accurate method for determining performance deterioration of the gas turbine engine in a fleet of gas turbine engines would be useful. With increased accuracy, the gas turbine engines may operate for longer periods of time prior to being taken off wing for service, repair, or overhaul.

BRIEF DESCRIPTION

Aspects and advantages of the invention will be set forth in part in the following description, or may be obvious from the description, or may be learned through practice of the invention.

In one exemplary aspect of the present disclosure, a computer-implemented method for determining gas turbine engine fleet performance deterioration is provided. The method includes receiving, by one or more computing devices, data indicative of deterioration parameter values for a plurality of gas turbine engines. The method also includes determining, by the one or more computing devices, an average deterioration parameter value for each gas turbine engine at a plurality of intervals. The method also includes determining, by the one or more computing devices, an individual engine slope between the average deterioration parameter value at each adjacent interval for each gas turbine engine. The method also includes determining, by the one or more computing devices, a fleet average slope between each adjacent interval based on the determined individual engine slopes between each adjacent interval. Additionally, the method includes providing, by one or more computing devices, a signal to a graphical user interface indicative of a gas turbine engine deterioration based at least in part on the determined fleet average slopes.

In an exemplary embodiment of the present disclosure, a control system for determining gas turbine engine fleet performance deterioration is provided. The control system includes one or more memory devices, and one or more processors. The one or more memory devices store instructions that when executed by the one or more processors cause the one or more processors to perform operations. The operations include receiving data indicative of deterioration parameter values for a plurality of gas turbine engines. The operations also include determining an average deterioration parameter value for each gas turbine engine at a plurality of intervals. The operations also include determining an individual engine slope between the average deterioration parameter value at each adjacent interval for each gas turbine engine. The operations also include determining a fleet average slope between each adjacent interval based on the determined individual engine slopes between each adjacent interval. The operations also include providing a signal to a graphical user interface indicative of a gas turbine engine deterioration based at least in part on the determined fleet average slopes.

In another exemplary embodiment of the present disclosure, a non-transitory computer-readable storage medium is provided. The non-transitory computer-readable storage medium has stored thereon executable computer code comprising a set of instructions that, when executed by a computer, causes the computer to perform operations. The operations include receiving data indicative of deterioration parameter values for a plurality of gas turbine engines. The operations further include determining an average deterioration parameter value for each gas turbine engine at a plurality of intervals, and determining an individual engine slope between the average deterioration parameter value at each adjacent interval for each gas turbine engine. The operations further include determining a fleet average slope between each adjacent interval based on the determined individual engine slopes between each adjacent interval. The operations further include providing a signal to a graphical user interface indicative of a gas turbine engine deterioration based at least in part on the determined fleet average slopes.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
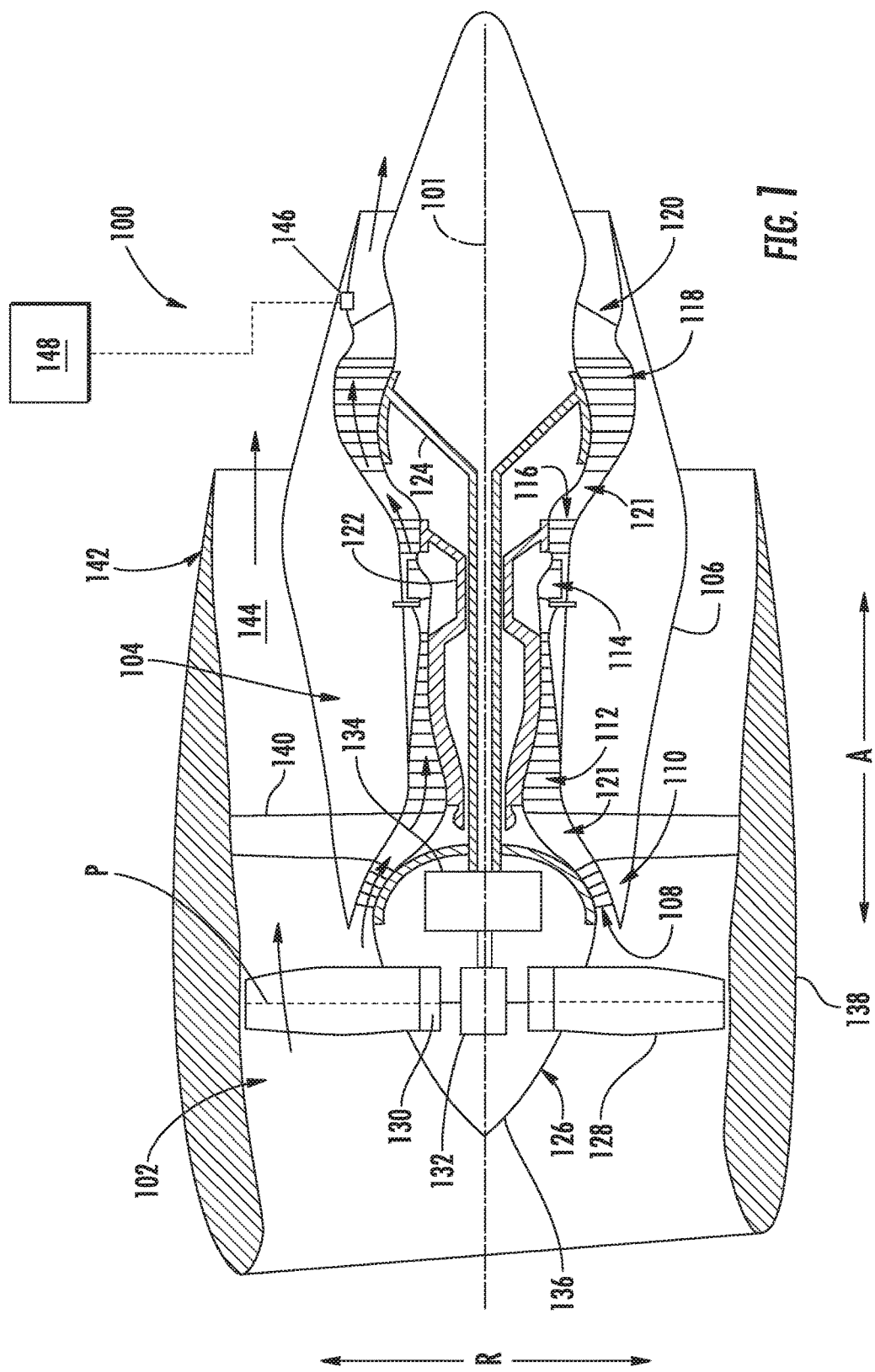
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The present disclosure is generally related to a system and method for determining performance deterioration of a fleet of gas turbine engines. The method includes receiving data indicative of deterioration parameter values for plurality of gas turbine engines. The data indicative of deterioration parameter values may be data indicative of, e.g., exhaust gas temperature values of the plurality of gas turbine engines. The method also includes determining an average deterioration parameter value for each gas turbine engine at a plurality of intervals, and subsequently determining an individual engine slope between the average deterioration parameter values at each adjacent interval for each gas turbine engine. The individual engine slopes are then used to determine fleet average slopes between each adjacent interval, which may then be used to determine a deterioration model for the fleet of gas turbine engines. Determining the individual engine slopes between adjacent intervals first, and subsequently determining the fleet average slopes between adjacent intervals, has the technical effect of determining a more accurate deterioration model for the fleet of gas turbine engines. Having a more accurate deterioration model for the fleet of gas turbine engines may allow for the fleet of gas turbine engines to operate for a longer period of time between services, overhauls, etc.

Referring now to the drawings, wherein identical numerals indicate the same elements throughout the figures, FIG. 1 provides a schematic cross-sectional view of a propulsion engine in accordance with an exemplary embodiment of the present disclosure. In certain exemplary embodiments, the propulsion engine may be configured a high-bypass turbofan jet engine 100, herein referred to as "turbofan 100." As shown in FIG. 1, the turbofan 100 defines an axial direction A (extending parallel to a longitudinal centerline 101 provided for reference), a radial direction R, and a circumferential direction C (extending about the axial direction A; not shown). In general, the turbofan 100 includes a fan section 102 and a core turbine engine 104 disposed downstream from the fan section 102.

The exemplary core turbine engine 104 depicted generally includes a substantially tubular outer casing 106 that defines an annular inlet 108. The outer casing 106 encases, in serial flow relationship, a compressor section including a second, booster or low pressure (LP) compressor 110 and a first, high pressure (HP) compressor 112; a combustion section 114; a turbine section including a first, high pressure (HP) turbine 116 and a second, low pressure (LP) turbine 118; and a jet exhaust nozzle section 120. The compressor section, combustion section 114, and turbine section together define a core air flowpath 121 extending from the annular inlet 108 through the LP compressor 110, HP compressor 112, combustion section 114, HP turbine section 116, LP turbine section 118 and jet nozzle exhaust section 120. A first, high pressure (HP) shaft or spool 122 drivingly connects the HP turbine 116 to the HP compressor 112. A second, low pressure (LP) shaft or spool 124 drivingly connects the LP turbine 118 to the LP compressor 110.

For the embodiment depicted, the fan section 102 includes a variable pitch fan 126 having a plurality of fan blades 128 coupled to a disk 130 in a spaced apart manner. As depicted, the fan blades 128 extend outwardly from disk 130 generally along the radial direction R. Each fan blade 128 is rotatable relative to the disk 130 about a pitch axis P by virtue of the fan blades 128 being operatively coupled to a suitable actuation member 132 configured to collectively vary the pitch of the fan blades 128, e.g., in unison. The fan blades 128, disk 130, and actuation member 132 are together rotatable about the longitudinal axis 12 by LP shaft 124 across a power gear box 134. The power gear box 134 includes a plurality of gears for stepping down the rotational speed of the LP shaft 124 to a more efficient rotational fan speed.

Referring still to the exemplary embodiment of FIG. 1, the disk 130 is covered by rotatable front hub 136 aerodynamically contoured to promote an airflow through the plurality of fan blades 128. Additionally, the exemplary fan section 102 includes an annular fan casing or outer nacelle 138 that circumferentially surrounds the fan 126 and/or at least a portion of the core turbine engine 104. The nacelle 138 is mechanically coupled to the core turbine engine 104 by a plurality of circumferentially-spaced outlet guide vanes 140. A downstream section 142 of the nacelle 138 extends over an outer portion of the core turbine engine 104 so as to define a bypass airflow passage 144 therebetween.

Additionally, the exemplary turbofan 100 depicted includes a plurality of sensors 146 for collecting data indicative of various operating parameters of the turbofan 100. Specifically, the turbofan 100 includes a sensor 146 positioned within, adjacent to, or proximate, the exhaust 120, such that the sensor 146 may collect data indicative of an exhaust gas temperature of the turbofan 100. Although not depicted, the turbofan 100 may further include sensors for determining a core speed (i.e., a rotational speed of the HP spool 122), a fuel flow, and/or temperatures along the core air flowpath 121.

Further, the turbofan 100 includes a computing device 148, depicted schematically, which may be utilized to control certain operations of the turbofan 100. For example, the computing device 148 may be utilized to control a fuel flow rate to a combustor of the combustion section 114 during operation. Additionally, the computing device 148 may be operably connected to the sensors 146, such that the computing device 148 may receive data indicative of the operating parameters collected by the sensors 146.

It should be appreciated, however, that the exemplary turbofan engine 100 depicted in FIG. 1 is provided by way of example only, and that in other exemplary embodiments, the turbofan engine 100 may have any other suitable configuration. For example, in other exemplary embodiments, the turbofan engine 100 may instead include a reduction gear system or configuration, may instead be configured as a direct drive turbofan engine, may include any other suitable number of compressors, turbines, and/or spools, etc. Furthermore, in other exemplary embodiments, the gas turbine engine may not be configured as a turbofan engine and instead may be configured as a turboprop engine, a turbojet engine, a turboshaft engine, or any other suitable aeronautical gas turbine engine. Furthermore, still, in other exemplary embodiments, the gas turbine engine may not be configured as an aeronautical gas turbine engine, and instead may be configured as a land-based gas turbine engine, e.g., for power generation, or an aeroderivative gas turbine engine, such as a nautical gas turbine engine.

Figure 2:
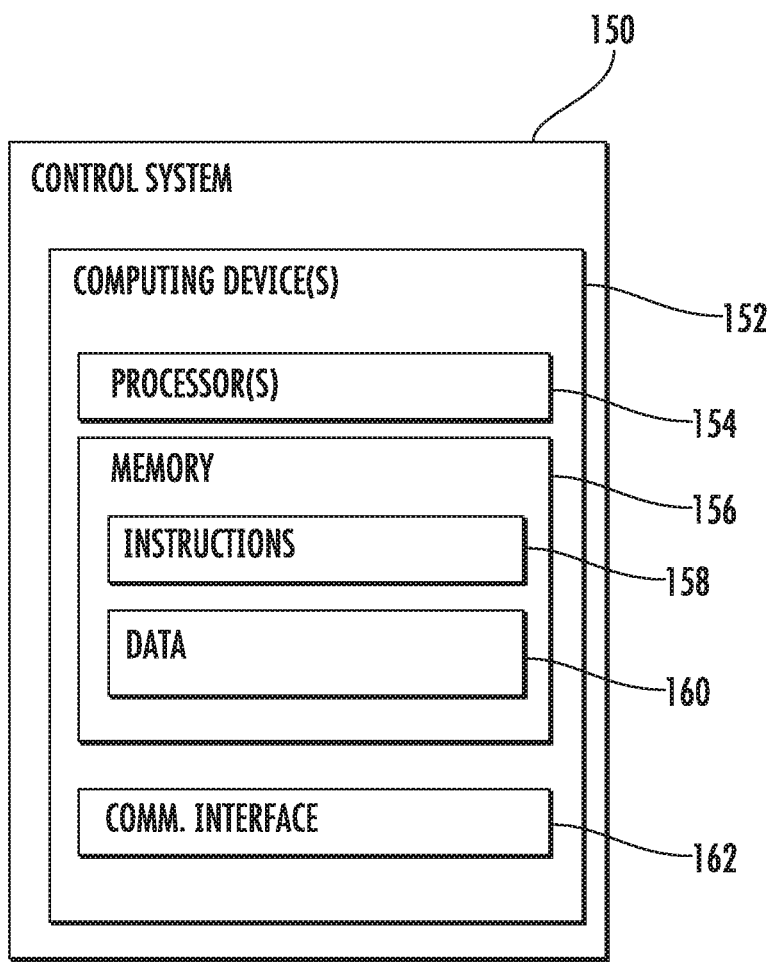
FIG. 2 is a schematic view of a control system in accordance with an exemplary embodiment of the present disclosure.

Referring now to FIG. 2, the turbofan engine 100 of FIG. 1 may include or be operably connected to a control system 150. As shown, the control system 150 can include one or more computing device(s) 152. Notably, the computing device 148 depicted in FIG. 1 may be one of the one or more computing device(s) 152 of the exemplary control system 150 depicted in FIG. 2. The computing device(s) 152 may be configured to execute one or more methods in accordance with exemplary aspects of the present disclosure (such as method 200 described below with reference to FIG. 3). The computing device(s) 152 can include one or more processor(s) 154 and one or more memory device(s) 156. The one or more processor(s) 154 can include any suitable processing device, such as a microprocessor, microcontroller, integrated circuit, logic device, or other suitable processing device. The one or more memory device(s) 156 can include one or more computer-readable media, including, but not limited to, non-transitory computer-readable media, RAM, ROM, hard drives, flash drives, or other memory devices.

The one or more memory device(s) 156 can store information accessible by the one or more processor(s) 154, including computer-readable instructions 158 that can be executed by the one or more processor(s) 154. The instructions 158 can be any set of instructions that when executed by the one or more processor(s) 154, cause the one or more processor(s) 154 to perform operations. The instructions 158 can be software written in any suitable programming language or can be implemented in hardware. In some embodiments, the instructions 158 can be executed by the one or more processor(s) 154 to cause the one or more processor(s) 154 to perform operations, such as the operations for regulating fuel flow, as described herein, and/or any other operations or functions of the one or more computing device(s) 152. Additionally, and/or alternatively, the instructions 158 can be executed in logically and/or virtually separate threads on processor 154. The memory device(s) 156 can further store data 160 that can be accessed by the processors 154.

The computing device(s) 152 can also include a communications interface 162 used to communicate, for example, with the components of turbofan engine 100 and/or other computing device(s) 152. The communications interface 162 can include any suitable components for interfacing with one more communications network(s), including for example, transmitters, receivers, ports, controllers, antennas, or other suitable components. Control system 150 may also be in communication (e.g., via communications interface 162) with the various sensors, such as sensors 146 described above, and may selectively operate turbofan engine 100 in response to user input and feedback from these sensors.

The technology discussed herein makes reference to computer-based systems and actions taken by and information sent to and from computer-based systems. It should be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

In certain exemplary embodiments, the control system 150 may be configured to receive information indicative of a fleet of gas turbine engines each including or operable with a separate computing device 152. For example, the control system 150 may be operably connected to computing devices 152 of the fleet of gas turbine engines. In certain exemplary embodiments, the fleet may include at least ten gas turbine engines, at least twenty gas turbine engines, or more. Each of the gas turbine engines in the fleet may be the same make and model gas turbine engine, and may in certain embodiments be configured in the same or similar manner as the turbofan 100 of FIG. 1. However, in other exemplary embodiments, the gas turbine engines in the fleet may alternatively be configured in any other suitable manner, or as any other suitable type of gas turbine engine. Such a configuration may allow for the control system to determine information regarding the fleet of gas turbine engines, such as performance deterioration of the gas turbine engines in the fleet, as described below.

Figure 3:
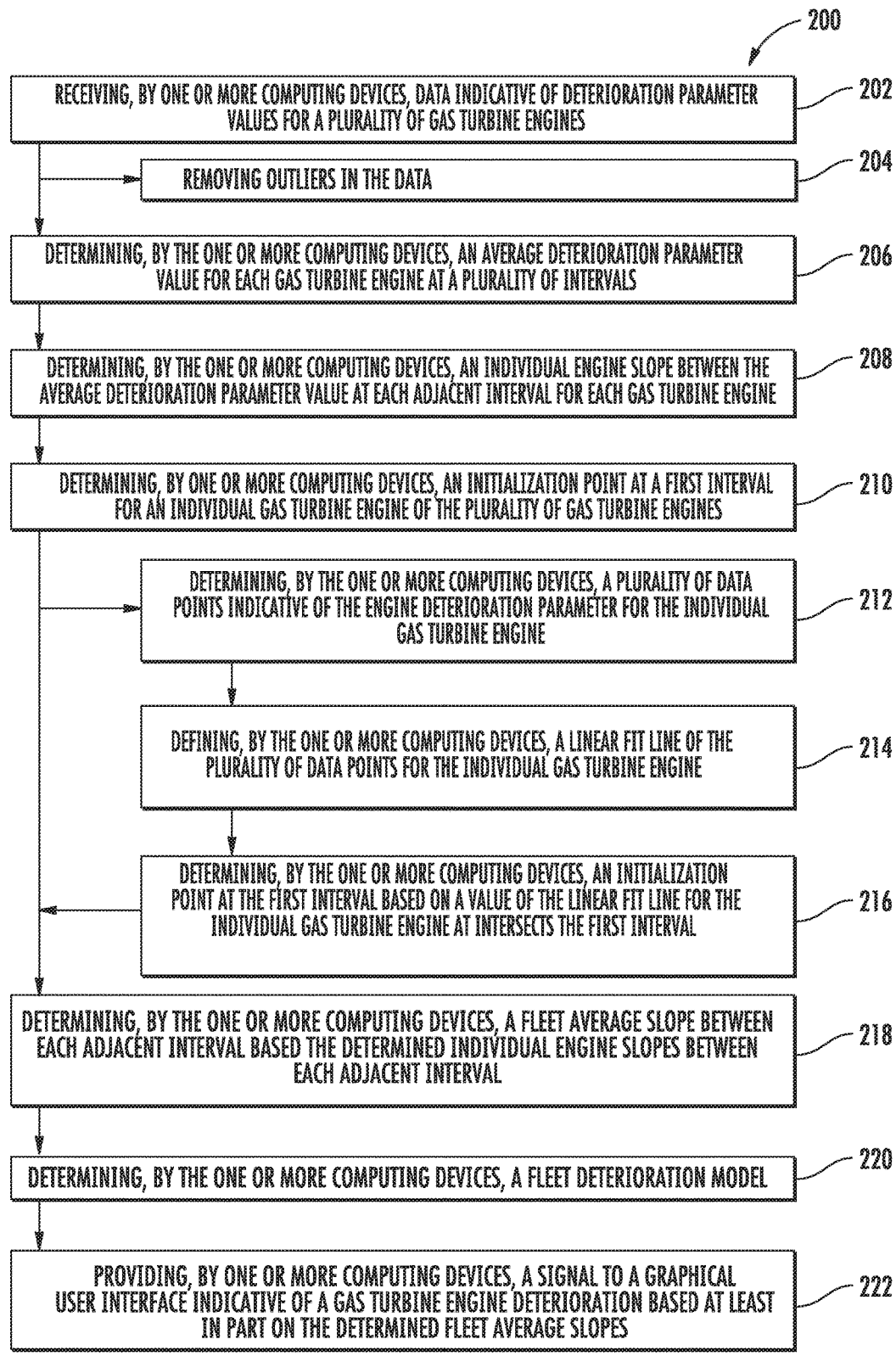
FIG. 3 is a flow diagram of a method for determining gas turbine engine fleet performance deterioration in accordance with an exemplary aspect of the present disclosure.

Referring now to FIG. 3, a method 200 for determining gas turbine engine fleet performance deterioration is provided. The method 200 may be a computer-implemented method implemented using the control system 150 of FIG. 2. The method 200 of FIG. 3 may allow for more accurate determinations of expected performance deterioration of gas turbine engines in a fleet of gas turbine engines.

The method 200 includes at (202) receiving, by the one or more computing devices, data indicative of deterioration parameter values for a plurality of gas turbine engines. For instance, the one or more computing devices 152 may receive data indicative of deterioration parameter values for the plurality of gas turbine engines. For example, in certain exemplary aspects, the deterioration parameter values may be exhaust gas temperature values, and receiving data indicative of deterioration parameter values for a plurality of gas turbine engines at (202) may include receiving data from one or more sensors, such as from one or more exhaust gas temperature sensors 146, of the respective gas turbine engines. It should be appreciated, however, that in other exemplary aspects, the deterioration parameter value may instead be any other gas turbine engine parameter which correlates to a performance deterioration of the gas turbine engine. For example, the deterioration parameter value may instead be core speed values, fuel flow values (e.g., cruise fuel flow rate values), and/or stall margin values.

Furthermore, for the exemplary method 200 of FIG. 3, receiving data indicative of the deterioration parameter values for the plurality of gas turbine engines at (202) further includes at (204) removing outliers in the data received at (202). For instance, the one or more computing devices 152 may remove outliers in the data received indicative of the deterioration parameter values for the plurality of gas turbine engines. More specifically, for the exemplary aspect depicted in FIG. 3, removing outliers in the data at (204) may include removing outliers following a generalized extreme studentized deviate test procedure. It should be appreciated, however, that in other exemplary aspects, any other suitable procedures or methods may be utilized for removing outliers in the data at (204). Accordingly, the method 200 may at (204) remove data points that are likely incorrectly measured data or other data points that would negatively affect an accuracy of the method 200.

Referring still to FIG. 3, the exemplary method 200 further includes at (206) determining an average deterioration parameter value for each gas turbine engine at a plurality of intervals, and at (208) determining an individual engine slope between the average deterioration parameter value at each adjacent interval for each gas turbine engine. For instance, the one or more computing devices 152 may determine the average deterioration parameter value for each gas turbine engine at the plurality of intervals, and further may determine an individual engine slope between the average deterioration parameter value at each adjacent interval for each gas turbine engine.

The plurality of intervals are for the exemplary aspect depicted a plurality of preset intervals, the intervals constant for each of the plurality of gas turbine engines. In certain exemplary aspects, the plurality of intervals may be a plurality of time intervals indicative of a time on wing for each of the respective gas turbine engines. In other exemplary aspects, however, the plurality of intervals may be a plurality of numerical intervals indicative of a number of engine cycles of the respective gas turbine engines.

Figure 4:
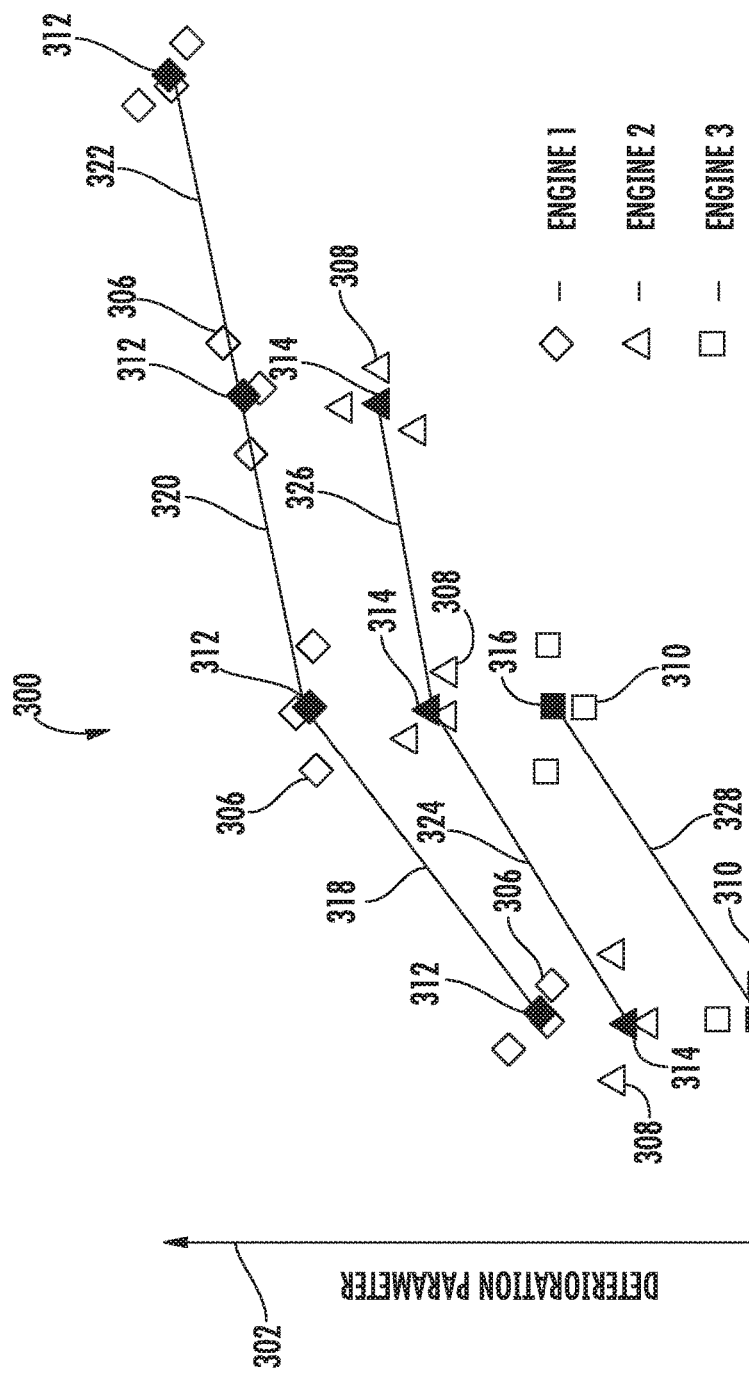
FIG. 4 is a graph plotting deterioration parameter values for a plurality of gas turbine engines illustrating certain exemplary aspects of the exemplary method depicted in FIG. 3.

By way of example, the above aspects of the exemplary method 200 will now be described with reference to FIG. 4. FIG. 4 provides a graph 300 plotting deterioration parameter values for a plurality of gas turbine engines illustrating certain exemplary aspects of the exemplary method 200 of FIG. 3. Specifically, the exemplary graph 300 of FIG. 4 plots deterioration parameter values (Y-axis, 302) for three gas turbine engines across various times on wing (X-axis, 304). Of course, in other exemplary aspects, the method 200 may apply to a fleet of any other suitable number of gas turbine engines, and with any other suitable number of deterioration parameter values for each of such gas turbine engines across any suitable number of intervals.

More specifically, the exemplary graph of FIG. 4 plots deterioration parameter values 306 of a first gas turbine engine, deterioration parameter values 308 of a second gas turbine engine, and deterioration parameter values 310 of a third gas turbine engine. Additionally, the graph 300 depicts an average deterioration parameter value 312 for the first gas turbine engine at each of the plurality of intervals, an average deterioration parameter value 314 for the second gas turbine engine at each of the plurality of intervals, and an average deterioration parameter value 316 for the third gas turbine engine at each of the plurality of intervals.

Each of the deterioration parameter values 306, 308, 310 for each of the gas turbine engines may be received by the one or more computing devices at (202). Similarly, the average deterioration parameter values 312, 314, 316 for each of the gas turbine engines may be determined by the one or more computing devices at (206).

It will be appreciated that determining the average deterioration parameter values for each of the gas turbine engines at (206) may include determining an average of the deterioration parameter values closest to each respective interval, for so long as the values are available. For example, in the exemplary aspect depicted in the graph 300 of FIG. 4, each interval is a preset time on wing, fixed for each of the gas turbine engines. Further, each interval may be indicative of a certain time interval. For example, each of the intervals may be representative of a multiple of two hundred (200) hours on wing. For example, a first time interval, t0, may be indicative of one hundred (100) hours on wing; a second interval, t1, may be indicative of three hundred (300) hours on wing; a third interval, t2, may be indicative of five hundred (500) hours on wing; etc. Further, with the exemplary aspect depicted in the graph 300 of FIG. 4, determining the average deterioration parameter values 312, 314, 316 for each of the gas turbine engines at (206) may include determining the average deterioration parameter values 312, 314, 316 at the first time interval, t0, for each of the gas turbine engines by averaging the deterioration parameter values 306, 308, 310 for hours zero (0) through two hundred (200); determining the average deterioration parameter values 312, 314, 316 at the second interval, t1, for each of the gas turbine engines by averaging the deterioration parameter values 306, 308, 310 for hours two hundred (200) through four hundred (400); determining the average deterioration parameter values 312, 314, 316 at the third interval, t3, for each of the gas turbine engines by averaging the deterioration parameter values 306, 308, 310 for hours four hundred (400) to six hundred (600), if available; etc.

Moreover, for the exemplary aspect depicted in the graph 300 of FIG. 4, the first gas turbine engine has been operating for the longest period of time, having the most deterioration parameter values 306 across the longest span of time on wing. The second gas turbine engine has been operating for less amount of time than the first gas turbine engine, having less deterioration parameter values 308 across a smaller span of time on wing. Further, the third gas turbine engine has been operating for less amount of time than the second gas turbine engine, having still less deterioration parameter values 310 across a still smaller span of time on wing.

Referring still also to the exemplary method 200 depicted in FIG. 3, it will be appreciated that in certain exemplary aspects, more information may be available for certain gas turbine engines as compared to others within the fleet. Accordingly, determining the average deterioration parameter values for each of the gas turbine engines at (206) of the exemplary method 200, may include determining average deterioration parameter values for certain gas turbine engines at a larger number of intervals as compared to other gas turbine engines within the fleet. For example, for the exemplary aspect depicted in the graph 300 of FIG. 4, determining the average deterioration parameter value for each of the gas turbine engines at (206) includes: determining the average deterioration parameter value 312 for the first gas turbine engine at a first number of intervals, n1; determining the average deterioration parameter value 314 for the second gas turbine engine at a second number of intervals, n2; and determining the average deterioration parameter value 316 for the third gas turbine engine at a third number of intervals, n3. For the exemplary aspect depicted in the graph 300 of FIG. 4, the third number of intervals, n3 (i.e., two intervals), is less than the second number of intervals, n2 (i.e., three intervals), and the second number of intervals, n2, is less than the first number of intervals, n3 (i.e., four intervals).

As is discussed above, the exemplary method 200 of FIG. 3 additionally includes at (208) determining an individual engine slope between the average deterioration parameter values at each adjacent interval for each gas turbine engine.

Referring again specifically to the exemplary aspect depicted in the graph 300 of FIG. 4, the determination at (208) with respect to the first gas turbine engine includes determining a first slope 318 between the average deterioration parameter value 312 at the second time interval, t1, and first time interval, t0; determining a second slope 320 between the average deterioration parameter values 312 at the third time interval, t2 and the second time interval, t1; and determining a third slope 322 between the average deterioration parameter values 312 at the fourth time interval, t3 and the third time interval, t2. The determination at (208) with respect to the second gas turbine engine includes determining a first slope 324 between the average deterioration parameter values 314 at the second time interval, t1 and first time interval, t0; and determining a second slope 326 between the average deterioration parameter values 314 at the third time interval, t2 and the second time interval, t1. Similarly, the determination at (208) with respect to the third gas turbine engine includes determining a first slope 328 between the average deterioration parameter values 316 at the second time interval, t1 and first time interval, t0.

Of course, no slopes are determined for the gas turbine engines between intervals were no deterioration parameter values, and thus no average deterioration parameter values, are available. Accordingly, as there are no deterioration parameter values 308 for the second gas turbine engine proximate the fourth time interval, t3, or deterioration parameter values 310 for the third gas turbine engine proximate the third time interval, t2 or fourth time interval, t3, no individual engine slopes are determined at (208) for these gas turbine engines between intervals adjacent to these time intervals.

Referring now back to FIG. 3, it should be appreciated that in certain exemplary aspects, one or more of the gas turbine engines may not include sufficient data proximate a first interval to accurately determine a value, or an initialization point, at the first interval. Accordingly, for the exemplary aspect depicted, the method 200 further includes at (210) determining, by one or more computing devices, an initialization point at a first interval for an individual gas turbine engine of the plurality of gas turbine engines. More particularly, for the exemplary aspect of FIG. 3, determining the initialization point at (210) further includes at (212) determining a plurality of data points indicative of the engine deterioration parameter for the individual gas turbine engine; defining at (214) a linear fit line of the plurality of data points for the individual gas turbine engine; and determining at (216) the initialization point at the first interval based on a value of the linear fit line for the individual gas turbine engine at the first interval.

For instance, the one or more computing devices 152 may determine the initialization at the first interval for an individual gas turbine engine, and more particularly, the one or more computing devices 152 may: determine a plurality of data points indicative of the engine deterioration parameter for the individual gas turbine engine; define a linear fit line of the plurality of data points for the individual gas turbine engine; and determine the initialization point at the first interval based on the value of the linear fit line for the individual gas turbine engine at the first interval.

Figure 5:
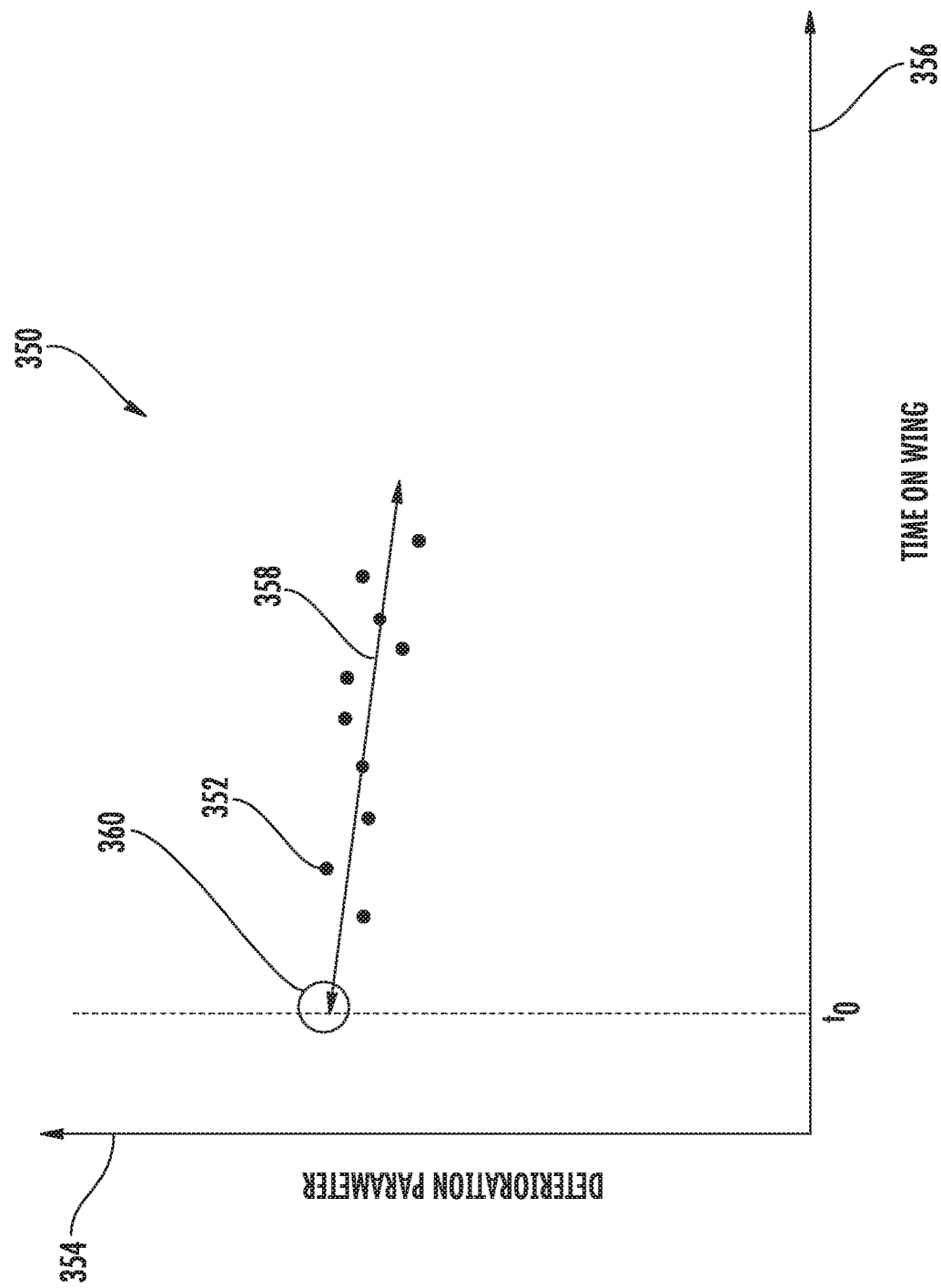
FIG. 5 is a graph plotting exemplary data indicative of an engine deterioration parameter for an individual gas turbine engine as may be used to determine an initialization point illustrating certain exemplary aspects of the exemplary method depicted in FIG. 3.

By way of example, certain of the above aspects of the exemplary method 200 will now be described with reference to FIG. 5. FIG. 5 provides a graph 350 plotting data indicative of an engine deterioration parameter for an individual gas turbine engine. Specifically, the graph 350 depicts a plurality of data points 352 indicative of the deterioration parameter (Y-axis, 354) for the individual gas turbine engine at various times on wing (X-axis, 356). Notably, in at least certain exemplary embodiments, each of the data points 352 is indicative of the engine deterioration parameter may be a rolling average of a plurality of engine deterioration parameter values. For example, in at least certain exemplary embodiments, each of the data points 352 indicative of the engine deterioration parameter may be a rolling average of the least five (5) engine deterioration parameter values, or of at least ten (10) engine deterioration parameter values. The graph 350 further depicts a linear fit line 358 of the plurality of data points 352. The linear fit line 358 may be determined in any suitable manner, such as, for example, using a least mean square criterion or any other suitable manner. Regardless, an initialization point 360, i.e., a deterioration parameter value at the first time interval, t0, may be determined by locating a value/location at which the linear fit line 358 intersects the first time interval, t0.

Notably, for the embodiment depicted, each of the data points 352 indicative of the engine deterioration parameter are located past the first interval, or rather, for the exemplary aspect depicted, at a time past the first time interval, t0. Such may be due to the information being lost, the gas turbine engine not being online during initial operation, or any other reason. Accordingly, determining the initialization point 360 for the exemplary gas turbine engine plotted in the graph 350 of FIG. 5 includes projecting the linear fit line 358 across the first time interval, t0, or rather, back in time across the first time interval, t0.

Referring again back to FIG. 3, the exemplary method 200 additionally includes at (218) determining a fleet average slope between each adjacent interval based on the determined individual engine slopes between each adjacent interval. More specifically, determining the fleet average slope at (218) may include averaging each of the individual engine slopes determined at (208) available between adjacent intervals. For instance, the one or more computing devices 152 may determine the fleet average slope between each adjacent interval based on the determined individual engine slopes between each adjacent interval, and more particularly, the one or more computing devices 152 may determine the fleet average slope by averaging each of the individual engine slopes available between adjacent intervals.

Further, the exemplary method 200 includes at (220) determining a fleet deterioration model based at least in part on the fleet average slopes determined between each adjacent interval at (218). For instance, the one or more computing devices 152 may determine the fleet deterioration model based at least in part on the fleet average slopes determined between each adjacent interval. As will be appreciated, determining the fleet deterioration model at (220) may include, in certain exemplary aspects, combining the fleet average slopes determined between each adjacent interval to determine a fleet deterioration line. The fleet deterioration line may simply be a combination of each of the fleet average slopes determined between each adjacent interval, or alternatively, may be, e.g., a polynomial fit line for each of the fleet average slopes determined between each adjacent interval. Furthermore, determining the fleet deterioration model at (220) may further include defining an initialization point based on the average initialization points for each of the gas turbine engines.

Figure 6:
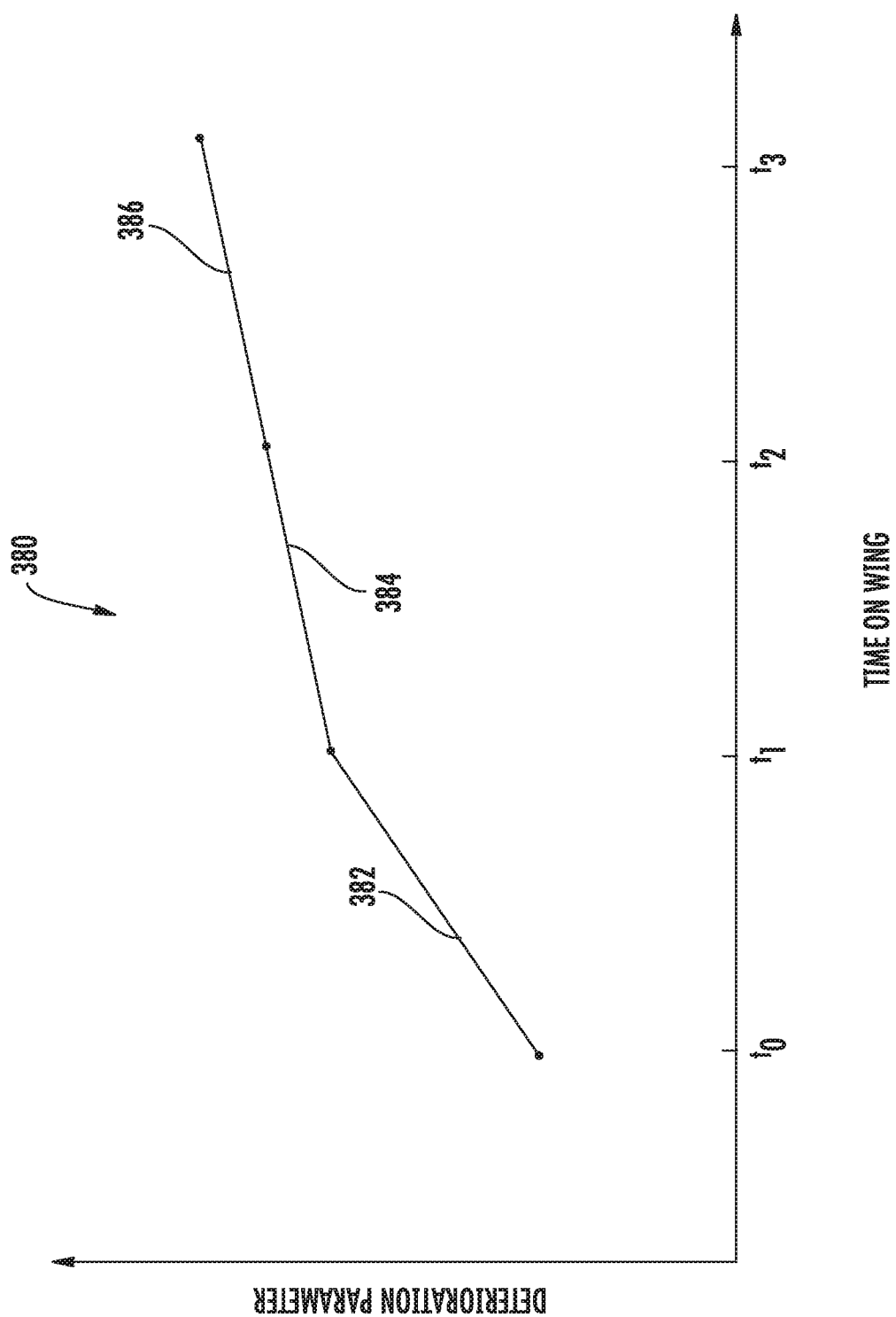
FIG. 6 is a graph plotting fleet average slopes between adjacent intervals for a plurality of gas turbine engines and a resulting fleet average model illustrating certain exemplary aspects of the exemplary method depicted in FIG. 3.

By way of example, certain of the above aspects of the exemplary method 200 will now be described with reference to FIG. 6. FIG. 6 provides a graph 380 plotting the fleet average slopes between adjacent intervals for a plurality of gas turbine engines and a resulting fleet average model.

More specifically, the graph 380 of FIG. 6 plots the fleet average slopes based on the data of the plurality of gas turbine engines of FIG. 4. As is depicted, the fleet average slopes between the adjacent intervals are an average of each of the individual engine slopes available between the respective adjacent intervals. More specifically, for the exemplary aspect depicted in FIG. 6, a first fleet average slope 382 is provided between the second time interval, t1 and the first time interval, t0; a second fleet average slope 384 is provided between the third time interval, t2 and the second time interval, t1; and a third fleet average slope 386 is provided between the fourth time interval, t3 and the third time interval, t2. The first fleet average slope 382 is an average of the first slope 318 of the first engine, the first slope 324 of the second engine, and the first slope 328 of the third engine. The second fleet average slope 384 is an average of the second slope 320 of the first engine, and the second slope 326 of the second engine. Additionally, the third fleet average slope 386 is equal to the third slope 322 of the first engine (i.e., the only available slope between the fourth time interval, t3 and the third time interval, t2). Accordingly, when the exemplary method 200 to FIG. 3 is applied to the exemplary aspect depicted in the graphs 300, 380 of FIGS. 4 and 6, determining the fleet average slopes (i.e., slopes 326, 328) between the intervals subsequent to the second number of intervals, n2, includes determining the fleet average slopes without use of average deterioration parameter values 314, 316 for the second and third gas turbine engine, and between the intervals subsequent to the third number of intervals, n3, without use of an average deterioration parameter value 316 of the third gas turbine engine.

Referring again to FIG. 3, the method 200 further includes at (222) sending a signal to a graphical user interface device indicative of a performance deterioration of one or more of the gas turbine engines of the fleet of gas turbine engines based at least in part on the determined fleet average slopes, and more particularly, based on the determined fleet deterioration model. For instance, the one or more computing devices 152 may send the signal to the graphical user interface device indicative of the performance deterioration of one or more of the gas turbine engines of the fleet of gas turbine engines based at least in part on the determined fleet average slopes, and more particularly, based on the determined fleet deterioration model.

It should be appreciated, however, that in other exemplary aspects, the method 200 may in additionally to sending the signal at (222), or in the alternative, take any other suitable action based at least in part on the determined fleet average slopes, and more particularly, based on the determined fleet deterioration model. For example, the method 200 may additionally or alternatively include scheduling a repair of a gas turbine engine of the plurality of gas turbine engines using the determined fleet average slope, and more particularly, based at least in part on the fleet deterioration model determined at (220). For instance, the one or more control devices 152 may schedule a repair of a gas turbine engine of the plurality of gas turbine engines based at least in part on the determined fleet average slopes, and more particularly, based at least in part on the fleet deterioration model determined at (220).

Additionally, or alternatively, still, the method 200 may further include providing a recommendation to a user (such as an owner of the gas turbine engine) to modify wash practices of one or more gas turbine engines in the fleet of gas turbine engines based at least in part on the fleet average slopes, and more particularly, based at least in part on the fleet deterioration model. For instance, the one or more control devices 152 may provide a recommendation to a user to modify wash practices of one or more gas turbine engines in the fleet of gas turbine engines based at least in part on the fleet average slopes, and more particularly, based at least in part on the fleet deterioration model.

Additionally, or alternatively still, the method 200 may further include sending an alert to maintenance personnel (such as a maintenance team, e.g., via a graphical user interface) indicating a particular engine needs to be taken off wing for repair or maintenance based at least in part on the fleet average slopes, and more particularly, based at least in part on the fleet deterioration model. For instance, the one or more control devices 152 may send an alert to maintenance personnel indicating a particular engine needs to be taken off wing for repair or maintenance based at least in part on the fleet average slopes, and more particularly, based at least in part on the fleet deterioration model Further, the method 200 may additionally or alternatively include taking a gas turbine engine (or a plurality of gas turbine engines in the fleet of gas turbine engines) out of service, e.g., for repair, servicing, or overhaul, and/or adjusting a planned overhaul workscope for the gas turbine engine (or a plurality of gas turbine engines in the fleet of gas turbine engines) based at least in part on the fleet average slopes, and more particularly, based at least in part on the fleet deterioration model. For instance, the one or more control devices 152 may take a gas turbine engine (or a plurality of gas turbine engines in the fleet of gas turbine engines) out of service, e.g., for repair, servicing, or overhaul, and/or adjust a planned overhaul workscope for the gas turbine engine (or a plurality of gas turbine engines in the fleet of gas turbine engines) based at least in part on the fleet average slopes, and more particularly, based at least in part on the fleet deterioration model.

Notably, the fleet average slopes determined at (218), and more particularly, the fleet deterioration model determined at (220) may further facilitate a discussion with owners and/or operators of the gas turbine engines within the fleet of how to change flight operations (including, e.g., routes, derate, climb path, rating, etc.) to reduce a performance deterioration of the gas turbine engines.

It will be appreciated, that utilizing a method in accordance with one or more exemplary aspects of the present disclosure to determine gas turbine engine fleet performance deterioration has the technical advantage of providing a more accurate deterioration model for a particular make and model of a gas turbine engine. More specifically, determining a fleet average slope between each adjacent interval using only the available individual engine slopes, and subsequent stitching these fleet average slopes together, has the technical advantage of providing for a more accurate overall deterioration model, which may provide for a more accurate determination of when, e.g., a particular engine within the fleet needs to be grounded or sent for repairs. Further, the method described herein may further allow for forecasting when a particular engine may need to be grounded and/or sent in for repairs based at least in part on the determined fleet average slopes and/or the determined fleet deterioration model, allowing for more efficient planning and determination of logistical issues associated therewith.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for determining gas turbine engine fleet performance deterioration, the method comprising:
   receiving, by one or more computing devices, data indicative of deterioration parameter values for a plurality of gas turbine engines;
   determining, by the one or more computing devices, an average deterioration parameter value for each gas turbine engine at a plurality of intervals comprising determining the average deterioration parameter value for a first gas turbine at a first number of intervals, n1, and determining the average deterioration parameter value for a second gas turbine engine at a second number of intervals, n2, wherein the second number of intervals, n2, is less than the first number of intervals, n1;
   determining, by the one or more computing devices, an individual engine slope between the average deterioration parameter value at each adjacent interval for each gas turbine engine;
   determining, by the one or more computing devices, a fleet average slope between each adjacent interval based on the determined individual engine slopes between each adjacent interval; and
   providing, by one or more computing devices, a signal to a graphical user interface indicative of a gas turbine engine deterioration based at least in part on the determined fleet average slopes.

2. The method of claim 1, further comprising:
   scheduling, by the one or more computing devices, a repair of a gas turbine engine of the plurality of gas turbine engines based at least in part on the determined fleet average slope.

3. The method of claim 1, wherein determining the fleet average slope between each adjacent interval comprises determining the fleet average slope(s) between the intervals subsequent to the second number of intervals, n2, without use of an average deterioration parameter value for the second gas turbine engine.

4. The method of claim 1, further comprising:
   determining, by one or more computing devices, an initialization point at a first interval for an individual gas turbine engine of the plurality of gas turbine engines.

5. The method of claim 4, wherein determining the initialization point at the first interval comprises:
   determining, by the one or more computing devices, a plurality of data points indicative of the engine deterioration parameter for the individual gas turbine engine;
   defining, by the one or more computing devices, a linear fit line of the plurality of data points for the individual gas turbine engine; and
   determining, by the one or more computing devices, an initialization point at the first interval based on a value of the linear fit line for the individual gas turbine engine that intersects the first interval.

6. The method of claim 5, wherein each of the plurality of data points indicative of the engine deterioration parameter for the individual gas turbine engine is a rolling average of a plurality of engine deterioration parameter values.

7. The method of claim 1, wherein the plurality of intervals are a plurality of time intervals indicative of a time on wing.

8. The method of claim 1, wherein the plurality of intervals are a plurality of numerical intervals indicative of a number of engine cycles.

9. The method of claim 1, wherein the plurality of intervals are a plurality of preset intervals.

10. The method of claim 1, wherein receiving data indicative of the deterioration parameter values for the plurality of gas turbine engines comprises removing outliers in the data.

11. The method of claim 1, wherein the deterioration parameter values are exhaust gas temperature values of the gas turbine engines.

12. A control system for determining gas turbine engine fleet performance deterioration, the control system comprising:
   one or more memory devices; and
   one or more processors, the one or more memory devices storing instructions that when executed by the one or more processors cause the one or more processors to perform operations, the operations comprising:
      receiving data indicative of deterioration parameter values for a plurality of gas turbine engines;
      determining an average deterioration parameter value for each gas turbine engine at a plurality of intervals comprising determining the average deterioration parameter value for a first gas turbine at a first number of intervals, n1, and determining the average deterioration parameter value for a second gas turbine engine at a second number of intervals, n2, wherein the second number of intervals, n2, is less than the first number of intervals, n1;
      determining an individual engine slope between the average deterioration parameter value at each adjacent interval for each gas turbine engine;
      determining a fleet average slope between each adjacent interval based on the determined individual engine slopes between each adjacent interval; and
      providing a signal to a graphical user interface indicative of a gas turbine engine deterioration based at least in part on the determined fleet average slopes.

13. The control system of claim 12, wherein the operations further include:
   scheduling, by the one or more computing devices, a repair of a gas turbine engine of the plurality of gas turbine engines based at least in part on the determined fleet average slope.

14. The control system of claim 12, wherein the operations further include:
   determining, by one or more computing devices, an initialization point at a first interval for an individual gas turbine engine of the plurality of gas turbine engines.

15. The control system of claim 14, wherein determining the initialization point at the first interval comprises:
   determining, by the one or more computing devices, a plurality of data points indicative of the engine deterioration parameter for the individual gas turbine engine;
   defining, by the one or more computing devices, a linear fit line of the plurality of data points for the individual gas turbine engine; and
   determining, by the one or more computing devices, an initialization point at the first interval based on a value of the linear fit line for the individual gas turbine engine that intersects the first interval.

16. The control system of claim 12, wherein the plurality of intervals are a plurality of preset time intervals indicative of a time on wing.

17. The control system of claim 12, wherein the deterioration parameter values are exhaust gas temperature values of the gas turbine engines.

18. A method for determining gas turbine engine fleet performance deterioration, the method comprising:
receiving, by one or more computing devices, data indicative of deterioration parameter values for a plurality of gas turbine engines;
determining, by the one or more computing devices, an average deterioration parameter value for each gas turbine engine at a plurality of intervals;
determining, by the one or more computing devices, an individual engine slope between the average deterioration parameter value at each adjacent interval for each gas turbine engine;
determining, by the one or more computing devices, a fleet average slope between each adjacent interval based on the determined individual engine slopes between each adjacent interval;
providing, by one or more computing devices, a signal to a graphical user interface indicative of a gas turbine engine deterioration based at least in part on the determined fleet average slopes; and
determining, by one or more computing devices, an initialization point at a first interval for an individual gas turbine engine of the plurality of gas turbine engines comprising determining a plurality of data points indicative of the engine deterioration parameter for the individual gas turbine engine; defining a linear fit line of the plurality of data points for the individual gas turbine engine; and determining the initialization point at the first interval based on a value of the linear fit line for the individual gas turbine engine that intersects the first interval.

19. The method of claim 18, wherein each of the plurality of data points indicative of the engine deterioration parameter for the individual gas turbine engine is a rolling average of a plurality of engine deterioration parameter values.

20. The method of claim 18, wherein determining, by the one or more computing devices, the average deterioration parameter value for each gas turbine engine at the plurality of intervals comprises determining the average deterioration parameter value for a first gas turbine at a first number of intervals, n1, and determining the average deterioration parameter value for a second gas turbine engine at a second number of intervals, n2, wherein the second number of intervals, n2, is less than the first number of intervals, n1.

* * * * *